US007950704B2

(12) United States Patent
Kovie

(10) Patent No.: US 7,950,704 B2
(45) Date of Patent: May 31, 2011

(54) CANCEL LEVER FOR CLAM SHELL VEHICLE DOORS

(75) Inventor: David Kovie, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 573 days.

(21) Appl. No.: 12/033,104

(22) Filed: Feb. 19, 2008

(65) Prior Publication Data

US 2009/0206615 A1 Aug. 20, 2009

(51) Int. Cl.
*E05B 3/00* (2006.01)
*B60J 10/08* (2006.01)

(52) U.S. Cl. ...... 292/336.3; 292/DIG. 21; 292/DIG. 65; 296/146.1; 296/146.9

(58) Field of Classification Search ............... 292/336.3, 292/DIG. 21, DIG. 65; 49/381; 296/146.1, 296/146.9

See application file for complete search history.

(56) References Cited

U.S. PATENT DOCUMENTS 3,243,222 A * 3/1966 Loughary et al. ............... 49/460
3,280,510 A * 10/1966 Vaux ............................... 49/401
5,803,516 A 9/1998 Hempel
6,533,346 B2 * 3/2003 Yu ................................ 296/152
6,752,440 B2 * 6/2004 Spurr ......................... 292/336.3
7,182,392 B2 * 2/2007 Sawajiri ..................... 296/146.1
7,309,100 B2 * 12/2007 Sawajiri ..................... 296/146.1

* cited by examiner

*Primary Examiner* — Carlos Lugo

(57) ABSTRACT

A door assembly for a vehicle body including a portal having a first end and a second end. A first door and a second door are pivotably coupled to the first end and the second end, respectively, of the portal. The first door includes an end panel opposite the first end of the portal, and a pivot is fixed to the end panel. A cancel lever is rotatably coupled to the pivot, and the cancel lever is arranged to be contacted by the second door at any location within a zone of contact determined by the relative positions of the first and second doors such that a force applied to the cancel lever by the second door includes a component perpendicular to a radius of the cancel lever at the point of contact.

18 Claims, 9 Drawing Sheets

SECT. A-A

SECT. A-A

SECT. A-A

CANCEL LEVER FOR CLAM SHELL VEHICLE DOORS

FIELD OF THE INVENTION

The present invention pertains to the field of automotive door latches, and more particularly to clam shell style doors latches.

BACKGROUND

In vehicles with short cabs and multiple rows of seats, such as some extended cab pickup trucks, the cabs are often not long enough for two sets of traditional doors. Clam shell style doors are frequently used because they are capable of providing a door allowing ingress and egress to a back seat even when space is limited. Clam shell style doors include a traditionally hinged front door for ingress and egress to the front seats, as well as a coach door (hereinafter referred to as the access door) to provide ingress and egress to the back seats. Clam shell style doors are used in vehicle openings without a pillar, so the latches for the traditionally hinged door are positioned on an end panel on the access door. As a result, the access door must be closed in order to properly close the front door. The access door can include a cancel lever that prevents operation of the door handle on the inside of the access door in order to prevent the access door from being opened while the front door is in a closed position, such as disclosed in U.S. Pat. No. 5,803,516, which is hereby incorporated by reference.

SUMMARY

In one disclosed embodiment, a door assembly is provided for a vehicle body. A portal on the vehicle body includes a first end and a second end. A first door is pivotably coupled to the first end of the portal, and the first door includes an end panel opposite the first end of the portal. A second door is pivotably coupled to the second end of the portal. A pivot is fixed to the end panel of the first door, and a cancel lever is rotatably fixed to the pivot. The cancel lever is arranged to be contacted by the second door at any location within a zone of contact determined by the relative positions of the first and second doors such that a force applied to the cancel lever by the second door includes a component perpendicular to a radius of the cancel lever at the point of contact.

In another embodiment, a door assembly is provided for a vehicle. A portal on the vehicle includes a first end and a second end. A first door is pivotably fixed to the first end of the portal, and the first door has at least one longitudinal face and at least one lateral face. A second door is pivotably fixed to the second end of the portal. A cancel lever is fixed to the longitudinally extending surface of the first door.

In an additional embodiment, a door assembly is provided for a vehicle. A portal on the vehicle includes a front end and a rear end. An access door is hinged to the rear end of the portal. The access door includes an end panel with at least one forward facing surface and at least one outboard facing surface. The outboard facing surface of the access door has an aperture, and a pivot is fixed to the access door at a location adjacent to the end of the aperture nearest to the front end of the portal. A front door is hinged to the front of the portal. A cancel lever is pivotably coupled to the pivot and includes a portion that extends through the aperture. The cancel lever is shaped so that the portion extending through the aperture is further toward the rear end of the portal than the pivot when the cancel lever is not contacted by the front door. A linkage is pivotably coupled to the cancel lever and is in communication with a mechanism for preventing operation of a door handle on the interior of the access door.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
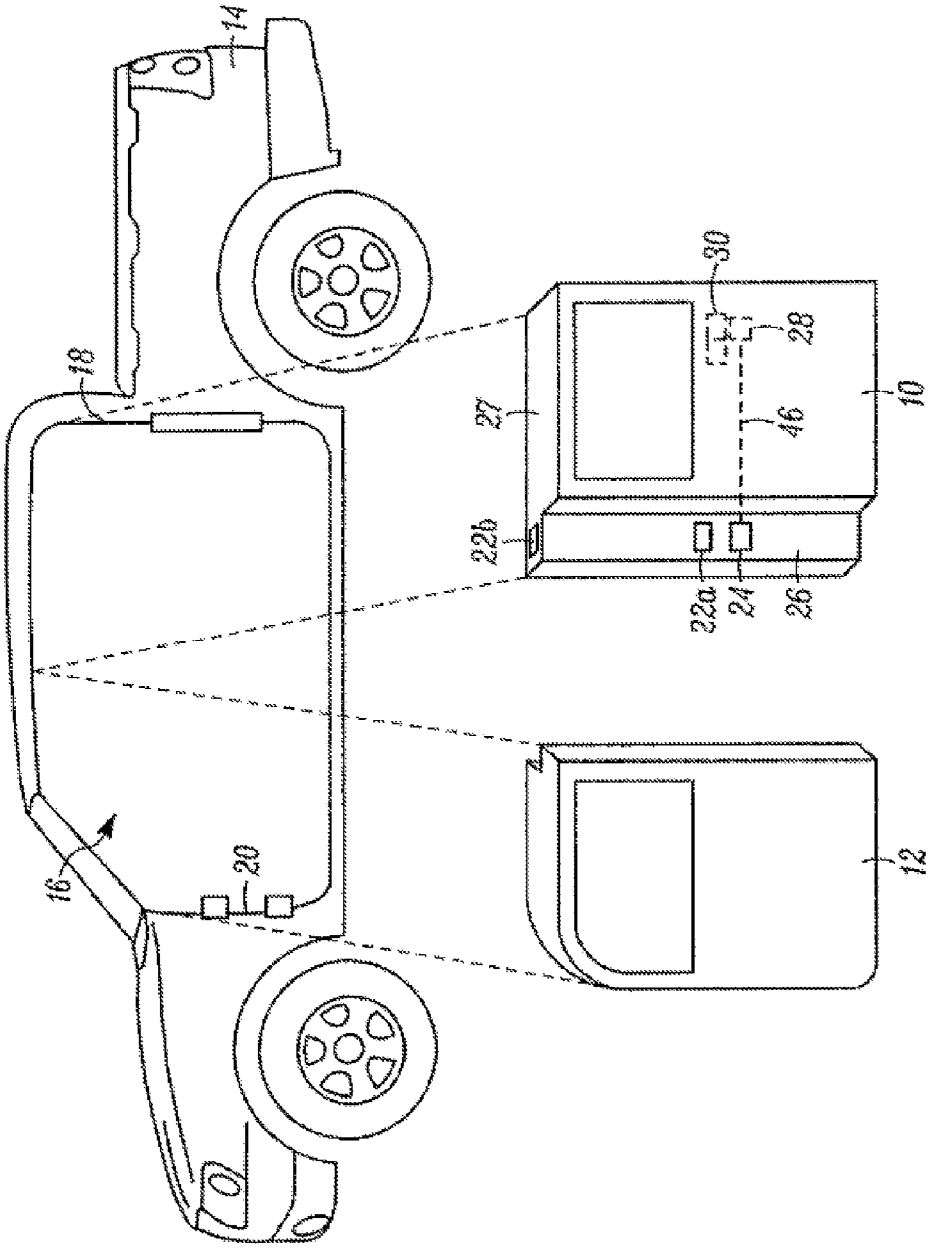
FIG. 1 is an exploded view of clam shell style doors in a vehicle portal with a phantom lines illustrating a mechanism for preventing operation of a door handle on the interior of an access door.

FIG. 1 illustrates clam shell style doors 10, 12 on a vehicle 14 having an opening 16 with a first end 18 and a second end 20. An access door 10 illustrated as a rear door is hinged to the first end 18 of the opening 16, and a traditionally hinged door 12 illustrated as a front door is hinged to the second end 20 of the opening 16. Latches **22*a* for securing the traditionally hinged door 12 to the access door 10 can be positioned on an end panel 26 of the access door 10, while latches 22*b* for securing the access door 10 to the vehicle 14 can be on a top panel 27 and/or a bottom panel (not shown) of the access door 10. A cancel lever 24 can also be positioned on the end panel 26 of the access door 10. The cancel lever 24 is in communication with a mechanism 28 for preventing the operation of a door handle 30 on the interior of the access door 10 via a linkage 46**.

Figure 2:
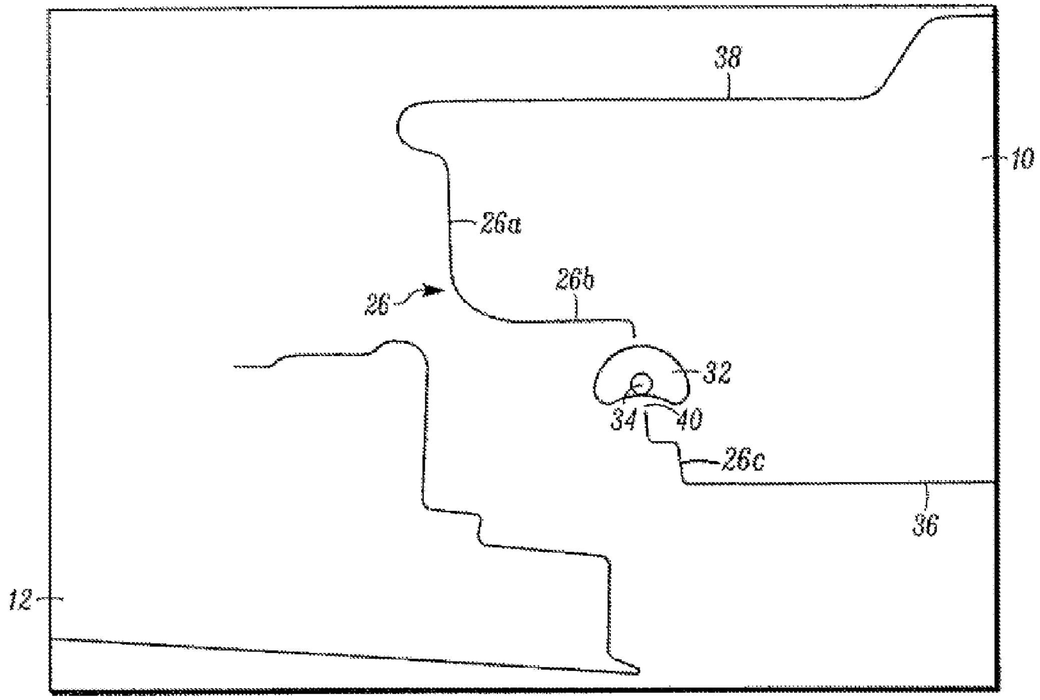
FIG. 2 BACKGROUND ART
FIG. 2 is a sectional view of a known cancel lever with an access door in a closed position and a traditionally hinged door in an open position.
Figure 3:
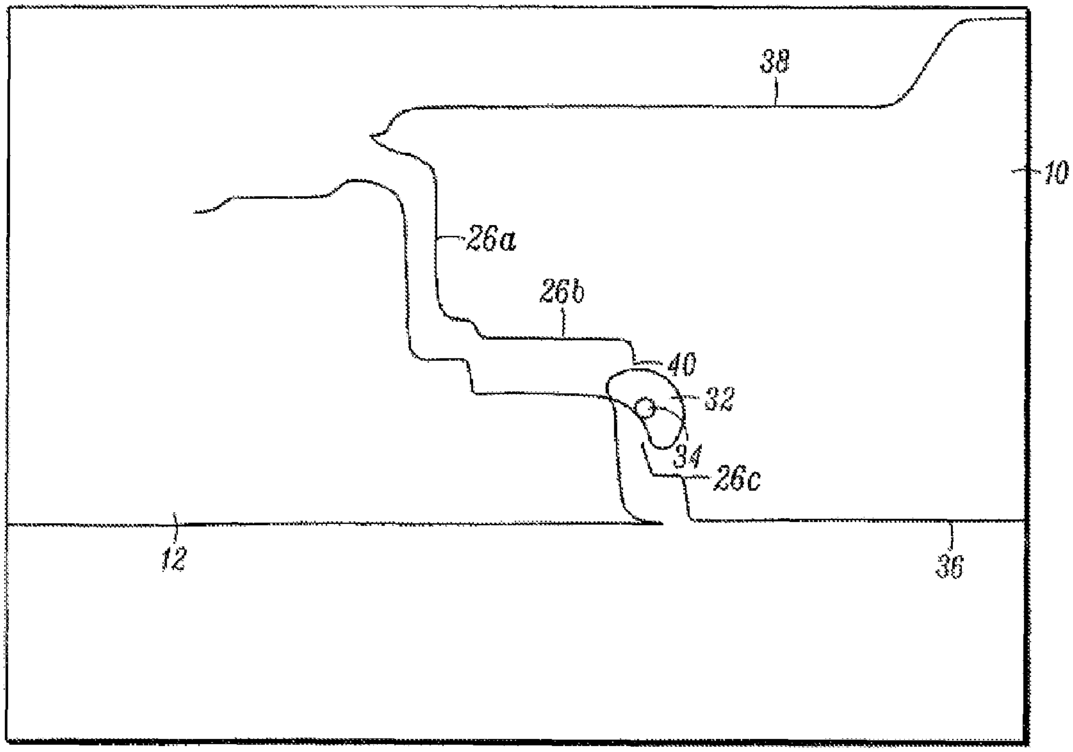
FIG. 3 BACKGROUND ART
FIG. 3 is a sectional view of the cancel lever of FIG. 2 with the access door in a closed position and the traditionally hinged door in a closed position.

FIG. 2 illustrates a conventional cancel lever 32 with the traditionally hinged door 12 in an open position, and FIG. 3 illustrates the conventional cancel lever 32 with the traditionally hinged door 12 in a closed position. The known cancel lever 32 is attached to a pivot 34 between a first door panel 36 and a second door panel 38, and projects through an aperture 40 defined by a laterally extending surface on a longitudinally facing portion **26*c* of the end panel 26. The lever 32 has a contact portion intended to be contacted by the traditionally hinged door 12 in order to pivot the lever 32 and actuate the mechanism 28 for preventing the operation the door handle 30 on the interior of the access door 10**.

Figure 4:
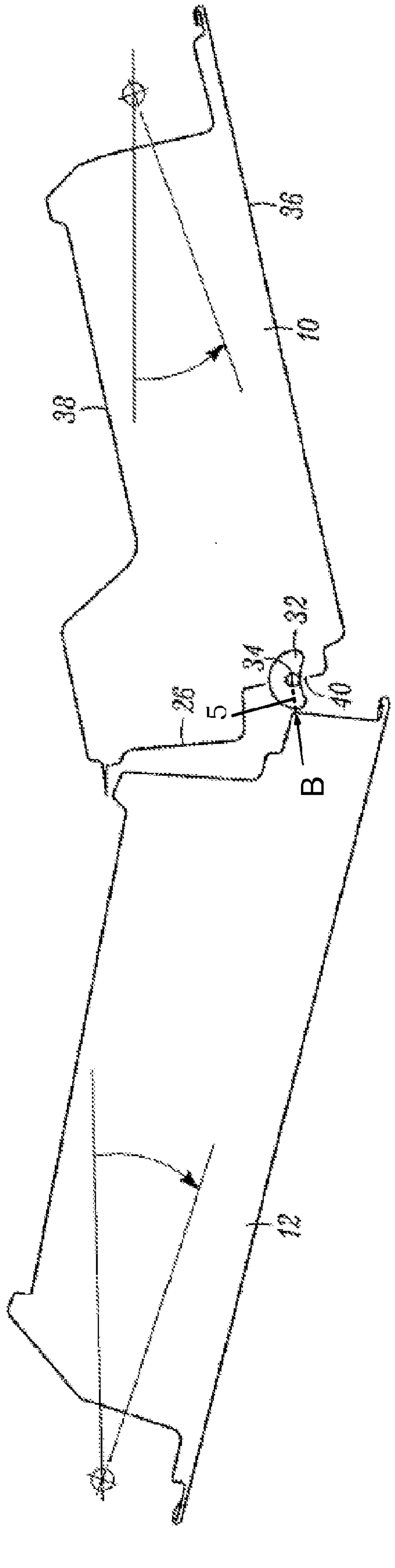
FIG. 4 BACKGROUND ART
FIG. 4 is a sectional view of the cancel lever of FIG. 2 with the access door in a partially open position and the traditionally hinged door jammed against the cancel lever.

However, occasionally the access door 10 is not in a completely closed position when the traditionally hinged door 12 is urged toward a closed position. As a result, the traditionally hinged door 12 can contact an unintended portion of the cancel lever 32, such as one of the round corners adjacent the contact portion intended to be contacted. FIG. 4 illustrates a jammed conventional cancel lever 32 due to the access door 10 being partially open when the traditionally hinged door 12 is urged toward a closed position. If the access door 10 is positioned such that the force applied by the traditionally hinged door 12 to the cancel lever 32 is substantially parallel to a radial vector of the cancel lever 32 extending between the pivot 34 and the point on the cancel lever 32 contacted by the traditionally hinged door 12, the cross product of the force vector and the radial vector equals zero, meaning the traditionally hinged door 12 does not apply torque to the cancel lever 32. As a result, conventional clam shell style doors 10, 12 are prone to jam the cancel lever 32 when the traditionally hinged door 12 is urged toward a closed position while the access door 10 remains partially open. Such jamming can also occur when the cross product is greater than zero, but too small to overcome friction and other forces that must be overcome for the cancel lever 24 to rotate.

Such jamming can rotate the cancel lever 32 to unintended positions relative to the aperture 40, causing the cancel lever 32 to become stuck in the aperture 40. The jamming can even break the cancel lever 32, or cause the doors 10, 12 to become stuck in partially closed position. The jamming can damage the traditionally hinged door 12. For example, the door 12 can be scratched by the cancel lever 32, making the door prone to rust, or the door 12 can be dented by the cancel lever 32 such that the door 12 no longer properly contacts the cancel lever 32.

Additionally, conventional cancel levers 32 have a small stroke due to spacing limitations as a result of the position of the cancel levers 32 along the laterally extending surfaces on longitudinal facing portions 26*a* and 26*c* of end panels 26. A consequence of the small stroke is that the traditionally hinged door 12 should be in a completely closed position in order for the cancel lever 32 to effectively prevent operation of the door handle 30. However, the latch 22*a* can be "half-latched", meaning the latch 22*a* is not fully engaged. Due to the small stroke of the cancel lever 32, a half-latched traditionally hinged door 12 may not actuate the cancel lever 32 to prevent operation of the door handle 30 on the interior of the access door 10. Additionally, when the traditionally hinged door 12 is half-latched, the driver may be under the impression that the traditionally hinged door 12 is fully closed and is actuating the cancel lever 32 because, for example, the dome light does not remain on and the dash does not indicate that a door is ajar. Even if the driver is alerted that the door 12 is not latched, the driver may not recognize that the cancel lever 32 is not actuated to prevent operation of the door handle 30. As a result, the door handle 30 may be actuated to unlatch the access door 10 from latches 22*b*. If this occurs, the traditionally hinged door 12 and the access door 10 are only prevented from opening by the half-latched latch 22*a*.

Moreover, the small stroke of the cancel lever 32 can prevent the cancel lever 32 from being actuated if build variations occur. Even a small variation in position of, for example, the placement of the cancel lever 32, the traditionally hinged door 12, or the access door 10 can prevent the cancel lever 32 from being actuated.

Figure 5:
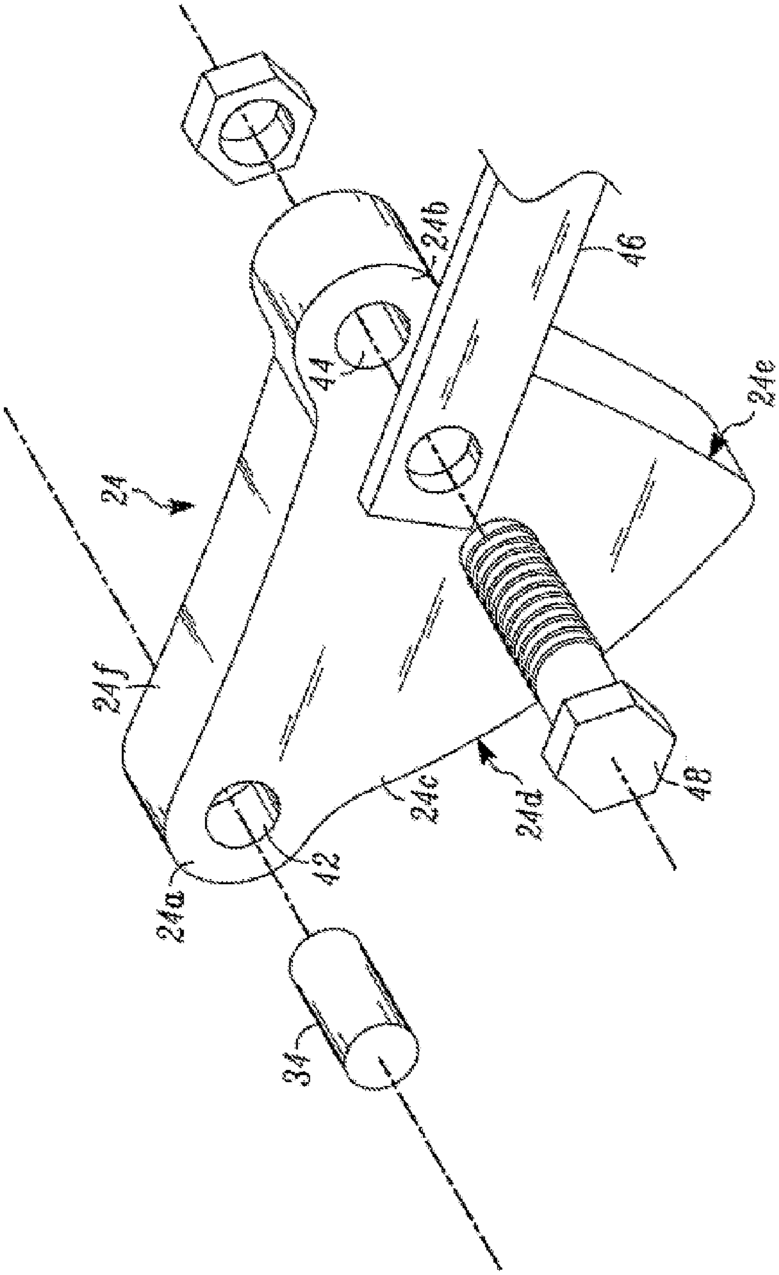
FIG. 5 is an exploded view of a cancel lever, a pivot, and a linkage.

FIG. 5 illustrates an embodiment of the cancel lever 24 arranged to be free from jamming and to avoid the problems associated with half-latching and build variations, along with the pivot 34 and the linkage 46. The cancel lever 24 can be relatively triangular shaped, with one portion 24*a* (hereinafter referred to as the "pivoting portion") configured to be coupled to the pivot 34, another portion 24*b* configured to be in communication with the mechanism 28 for preventing operation of the interior access door handle 30, and another portion 24*c* configured to be contacted by the traditionally hinged door 12. As illustrated, the pivoting portion 24*a* of the cancel lever 24 occupies one corner of the cancel lever 24 and includes an aperture 42 configured for insertion of the pivot 34. Alternatively, if the pivot 34 is in the form of a hinge, the pivoting portion 24*a* of the cancel lever 24 can include screw holes or otherwise be configured to be fixed to the hinge. The exact form of the pivoting portion 24*a* of the cancel lever 24 should correspond with the structure of the pivot 34. If desired, the pivoting portion 24*a* of the cancel lever 24 can include an edge configured to abut the end panel 26 when the cancel lever 24 is not contacted by the traditionally hinged door 12 in order to limit the amount of rotation of the cancel lever 24 outside of the end panel 26.

Also as illustrated, the portion 24*b* (hereinafter referred to as the "communicating portion") of the cancel lever 24 in communication with the mechanism 28 for preventing operation of the inside handle 30 of the access door 10 occupies a second corner of the relatively triangular shaped cancel lever 24. The communicating portion 24*b* of the cancel lever 24 can include a second aperture 44 configured to accept the end of the linkage 46, which communicates the rotation of the cancel lever 24 to the mechanism 28 for preventing operation of the handle 30 on the interior of the access door 10. The linkage 46 can be rotatably fixed to the cancel lever 24. For example, the linkage 46 can include a hook that is inserted through the aperture 44, or the cancel lever 24 can include a pivot that is attached to the linkage 46, such as the illustrated bolt 48. Alternatively, the coupling between the cancel lever 24 and the linkage 46 can take any other formed recognized as suitable by one of skill in the art having knowledge of the present application. For example, the rotation of the cancel lever 24 can generate an electronic signal, which is then relayed to a motor in order to actuate the mechanism 28 for preventing the operation of the door handle 30.

A third portion 24*c* of the cancel lever 24 is configured to be contacted by the traditionally hinged door 12 (hereinafter referred to as the "contact portion"). The contact portion 24*c* as illustrated occupies the majority of the cancel lever 24. The contact portion 24*c* can have two curved edges 24*d*, 24*e*. As illustrated, the first edge 24*d* has a convexly curved shape, though the shape of the first curved edge 24*d* can be based on the geometry of the doors 10, 12 and can therefore have a different shape than illustrated. Specifically, the edge 24*d* can be based on the position of the cancel lever 24 on the access door 10, the positions of the access door 10 that allow the cancel lever 24 to be contacted by the traditionally hinged door 12, and the geometry of the traditionally hinged door 12. With the cancel lever 24 properly curved, the traditionally hinged door 12 cannot apply force directly parallel to a radius 5 of the cancel lever 24 extending from the point on the cancel lever 24 that force is applied to the pivot 34. Depending on the geometry of the doors 10, 12 and the placement of the cancel lever 24, the edge 24*d* can be straight or have some other non-curved shape while still permitting the cancel lever 24 to function properly. The second curved edge 24*e* can be curved such that the cancel lever 24 does not contact the aperture 40 when the cancel lever 24 is pivoted into the aperture 40 by the traditionally hinged door 12. If the aperture 40 is sufficiently large, the aperture 40 need not be a consideration in determining the shape of the cancel lever 24.

As illustrated, the cancel lever 24 has a straight edge 24*f* connecting the pivoting portion 24*a* with the communicating portion 24*b*, and the communicating portion 24*b* is positioned longitudinally closer to the hinged end of the access door 10 than the pivoting portion 24*a*. However, the edge 24*f* need not be straight depending on the shape of the cancel lever 24; the shape of the edge 24*f* can vary depending on the shape of the cancel lever 24. While the cancel lever 24 is illustrated having a substantially triangular shape, it can also have a rectangular, oval, or other polygonal shape. For example, if the cancel lever 24 has a square shape, the edge 24*f* connecting the pivoting portion 24*a* with the communicated portion 24*b* includes a corner. Moreover, the placement of the various portions 24*a*, 24*b*, 24*c* and edges 24*d*, 24*e*, 24*f* can vary depending on the shape of the cancel lever 24.

Figure 6:
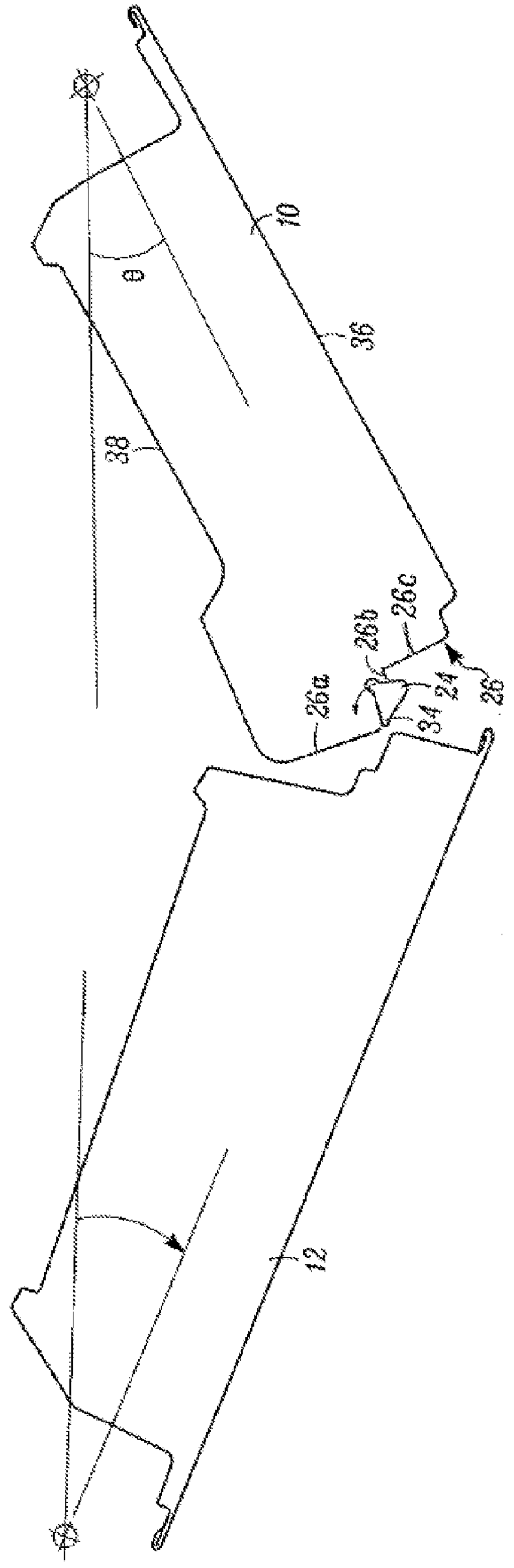
FIG. 6 is a sectional view illustrating the access door and a traditionally hinged door at relative locations placing a cancel lever slightly outside a zone of contact.

FIG. 6 illustrates the access door 10 and the traditionally hinged door 12 in positions such that the traditionally hinged door 12 will slightly miss contacting the cancel lever 24 if urged toward a closed position. In other words, FIG. 6 illustrates the access door 10 and the traditionally hinged door 12 at relative locations such that the cancel lever 24 is slightly outside of a zone of contact. If the access door 10 were positioned slightly more in a closed direction, i.e., if the access door 10 were positioned such that an angle θ between the position of the access door 10 as illustrated and a closed position is slightly smaller, then the cancel lever 24 would be placed in a zone of contact. With the cancel lever 24 in a zone of contact, the traditionally hinged door 12 can contact the cancel lever 24 when urged toward a closed position.

Figure 7:
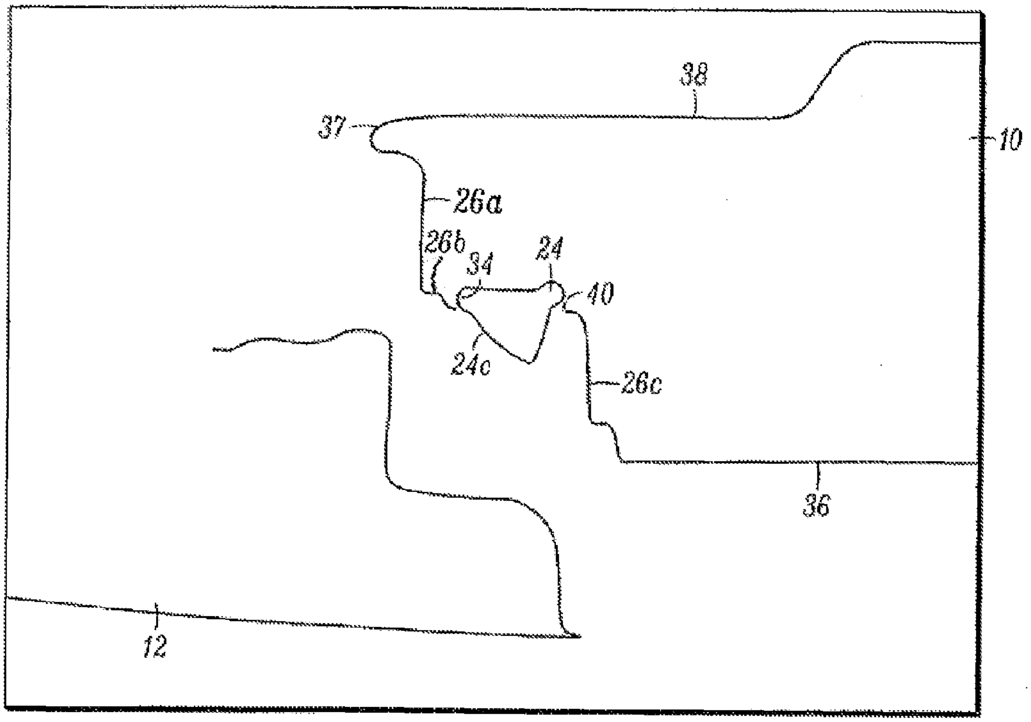
FIG. 7 is a sectional view of the cancel lever with the access door in a closed position and the traditionally hinged door in an open position.
Figure 8:
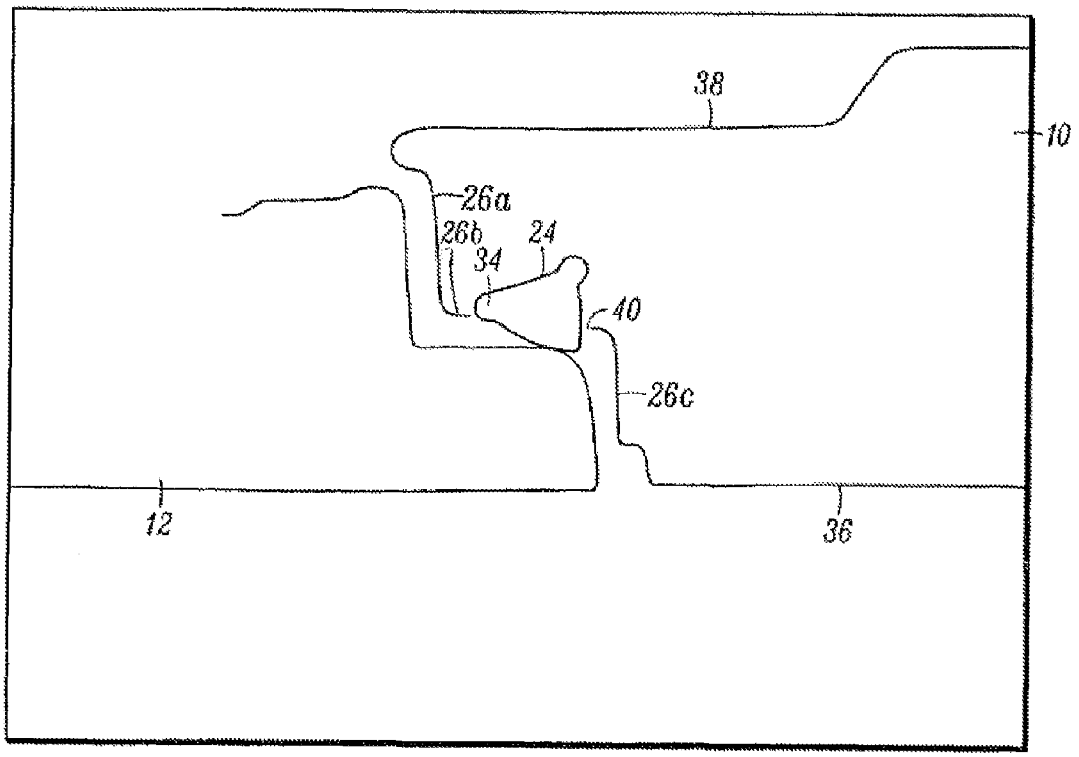
FIG. 8 is a sectional view of the cancel lever with the access door in a closed position and the traditionally hinged door in a closed position.

FIGS. 7 and 8 illustrate an embodiment of the cancel lever 24 of the present invention with the traditionally hinged door 12 in an open position and a closed position, respectively. The cancel lever 24 is installed on the access door 10 including a first door panel 36, a second door panel 38, and an end panel 26. The end panel 26 can be formed integrally with the first door panel 36 and/or the second door panel 38. The end panel 26 can include at least one substantially longitudinal facing portion 26*a* and 26*c* with laterally extending surfaces and at least one substantially laterally facing portion 26*b* with a longitudinally extending surface, with the direction the portions 26*a*, 26*b* and their corresponding surfaces are facing determined in reference to the conventional lateral and longitudinal orientations of the vehicle 14.

The pivot 34 is positioned adjacent to the end panel 26. As illustrated, the pivot 34 is on the interior of the end panel 26. However, the pivot 34 can alternatively be located in line with the end panel 26 or on the exterior of the end panel 26. The pivot 34 should be protected from or strong enough to withstand contact from the traditionally hinged door 12. The pivot 34 can be a rod supported by bushings or bearings, a hinge, or any other pivotable element recognized as suitable by one of skill in the art having knowledge of the present application.

A substantially laterally facing portion 26*b* of the end panel 26 includes a longitudinally extending surface defining the aperture 40. As illustrated, the cancel lever 24 projects from the interior of the end panel 26, through the aperture 40, and past the longitudinally extending surface of the end panel 26 when not contacted by the traditionally hinged door 12. The aperture 40 can be located adjacent the pivot 34 in a direction toward the hinged end of the access door 10. The size of the aperture 40 can be such that the aperture 40 permits a portion of the cancel lever 24 to project to outside of the end panel 26, but small enough such that the cancel lever 24 can abut the end panel 26 to prevent further rotation of the lever 24. The aperture 40 need not be small enough to prevent rotation of the cancel lever 24 to the exterior of the end panel 26 if some other structure adequately does so. Alternatively, if the pivot 34 is located on the exterior of the end panel 26, the aperture 40 provides an opening through which the cancel lever 24 can rotate when contacted by the traditionally hinged door 12. The aperture 40 can be configured differently from the slot as illustrated. For example, the aperture 40 can be a recess in the end panel 26 or take another form recognized as suitable by one of skill in the art having knowledge of the present application for permitting the cancel lever 24 to be contacted by the traditionally hinged door 12 and rotated in response to the contact.

Figure 9:
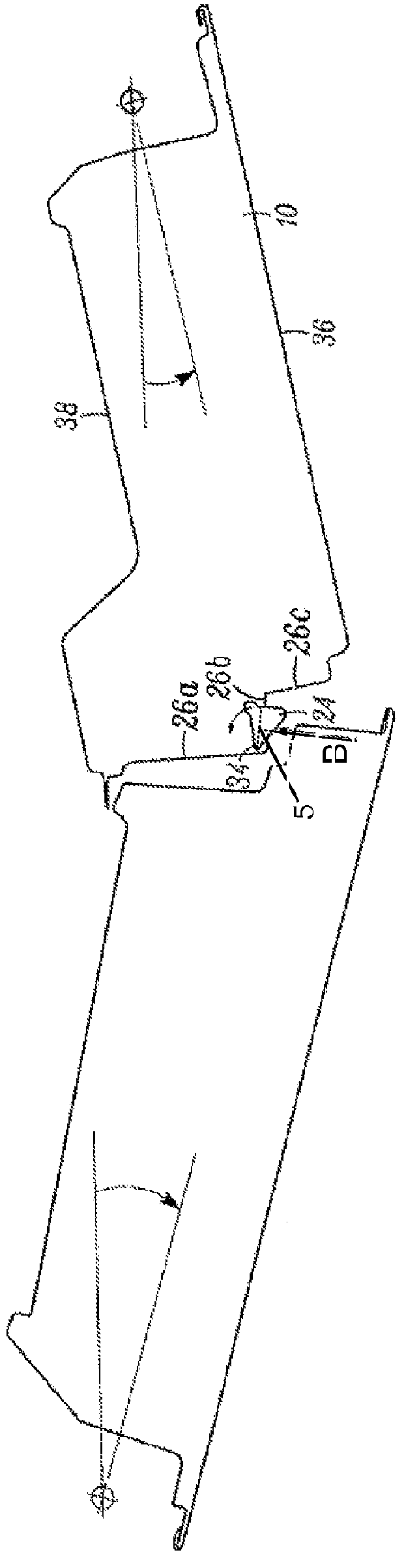
FIG. 9 is a sectional view of the cancel lever with the doors in the same position as illustrated in FIG. 4.

FIGS. 7-9 additionally illustrated the access door 10 as including a flange 37 for creating a seal between the door 10, 12 and aiding in the alignment of the doors 10, 12. The flange 37 can also have the effect of altering the positions of the access door 10 that place the cancel lever 24 in the zone of contact, thereby preventing the cancel lever 24 from contacting an unintended portion of the traditionally hinged door 12. However, as illustrated in FIG. 6, such a flange 37 need not be included.

The cancel lever 24 can be installed by attaching the cancel lever 24 to the pivot 34 and the linkage 46. As illustrated in FIG. 7, the contact portion 24*c* of the cancel lever 24 projects through the aperture 40 on a longitudinally extending surface of a laterally facing portion 26*b* of the end panel 26 when not contacted by the traditionally hinged door 12. Also in this embodiment, the contact portion 24*c* of the cancel lever 24 is positioned closer to the hinged end of the access door 10 than the pivot 34. When the traditionally hinged door 12 is urged toward a closed position, as illustrated in FIG. 8, the cancel lever 24 is rotated in the same direction as the traditionally hinged door 12. As a result, the cancel lever 24 actuates the mechanism 28 for preventing the operation of the handle 30 on the interior of the access door 10 by biasing the linkage 46. When the traditionally hinged door 12 is moved to an open position, the cancel lever 24 is biased back to the position as illustrated in FIG. 7.

The cancel lever 24 eliminates the jamming problem associated with known cancel levers 32. Jamming occurs when the force B applied to a point on the cancel lever 24 is parallel to the radius 5 of the point on the cancel lever 24 extending through the pivot 34. In this case, the cross product of the force vector B and the radial vector equals zero, meaning the traditionally hinged door 12 does not apply torque to the cancel lever 24. Jamming can also occur when the cross product is greater than zero, but too small to overcome friction and other forces that must be overcome for the cancel lever 24 to rotate. However, as illustrated in FIG. 9, even if the access door 10 is in a partially open position, the traditionally hinged door 12 always strikes the cancel lever 24 at a position that causes the cancel lever 24 to rotate. The cancel lever 24 is arranged such that the traditionally hinged 12 door cannot apply force B parallel to a radius 5 of the cancel lever 24, so the traditionally hinged door 12 must apply torque to the cancel lever 24.

Additionally, the cancel lever 24 can have a longer stroke than a conventional cancel lever 32 because the placement of the cancel lever 24 on a longitudinally extending surface of a laterally facing portion 26*b* of the end panel 26 permits more room for rotation of the cancel lever 24. Even if the traditionally hinged door 12 is half-latched, the cancel lever 24 can be rotated a sufficient amount to actuate the linkage 46 to prevent operation of the door handle 30. The longer stroke also permits the cancel lever 24 to function despite build variations.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A door assembly for a vehicle having a vehicle body comprising:

a portal defined by the vehicle body, the portal having a first end and a second end;

a first door pivotably coupled to the first end of the portal and including an end panel opposite the first end of the portal, the end panel having a first face and a second face extending in a lateral direction of the vehicle and a third face extending in the longitudinal direction of the vehicle;

a second door pivotably coupled to the second end of the portal;

a pivot fixed to the third face of the end panel of the first door; and a cancel lever rotatably coupled to the pivot, the cancel lever operably coupled to a latch mechanism and movable between a latch operation prevention position in which the latch mechanism prevents operation of an interior door handle on the first door and a latch operation allowance position in which the latch mechanism allows operation of the interior door handle, wherein the cancel lever is configured to be contacted by the second door at any location within a zone of contact that is determined by the relative positions of the first and second doors such that a force applied to the cancel lever by the second door is non-parallel to a radius of the cancel lever at the point of contact, the force rotating the cancel lever about the pivot to the latch operation prevention position.

2. The door assembly of claim 1, wherein the cancel lever includes a first portion configured to be coupled to the pivot, a second portion configured to be in communication with the latch mechanism, and a third portion configured to be contacted by the second door; and wherein the first portion is further away in a longitudinal direction of the first door from the first end of the portal than the second portion when the cancel lever is not contacted by the second door.

3. The door assembly of claim 2, wherein the cancel lever is substantially triangularly shaped, with the first portion occupying a first corner, the second portion occupying a second corner, and the third portion extending from adjacent to the first corner to a third corner.

4. The door assembly of claim 2, wherein the third portion of the cancel lever is defined by a first edge beginning adjacent to the pivot and extending to a point laterally outboard of the pivot that is longitudinally closer to the first end of the portal than the pivot.

5. The door assembly of claim 4, wherein the first edge includes a convexly shaped portion.

6. The door assembly of claim 4, wherein the cancel lever is further defined by a second edge beginning at the point laterally outboard of the pivot and ending adjacent to the second portion.

7. The door assembly of claim 6, further comprising an aperture in the third face of the end panel of the first door through which the cancel lever rotates, and wherein the second edge includes a convexly shaped portion configured to freely pass through the aperture when the cancel lever is contacted by the second door.

8. The door assembly of claim 6, wherein the cancel lever includes a substantially straight edge extending from the second portion to the first portion.

9. The door assembly of claim 1, wherein the cancel lever is arranged such that when the second door contacts the cancel lever, the cancel lever rotates about the pivot in the same rotational direction as the second door rotates relative to the second end of the portal.

10. The door assembly of claim 1, wherein the cancel lever includes a first portion configured to be coupled to a pivot and a third portion configured to be contacted by the second door; and wherein the cancel lever is configured to move such that the third portion is in a position that is non-parallel to the third face when the cancel lever is in the latch operation allowing position.

11. The door assembly of claim 1, wherein the first door is an access door for ingress and egress to a backseat and the second door is a conventional door for ingress and egress to a front seat.

12. The door assembly of claim 1, wherein when the second door contacts the cancel lever, the cancel lever rotates from the latch operation allowing position to the latch operation prevention position.

13. The door assembly of claim 1, further comprising:

an aperture defined in the third face of the end panel through which the cancel lever rotates, the aperture being located longitudinally closer to the first end of the portal than the pivot.

14. A door assembly for a vehicle having a vehicle body comprising:

a portal defined by the vehicle body and having a first end and a second end;

a first door pivotably fixed to the first end of the portal, the first door having a first face and a second face extending in a lateral direction of the vehicle, and a third face extending in a longitudinal direction of the vehicle;

a second door pivotably fixed to the second end of the portal; and a cancel lever movably coupled to the third face, the cancel lever being operably coupled to a latch mechanism and movable between a latch operation prevention position in which the latch mechanism prevents operation of an interior door handle on the first door and a latch operation allowing position in which the latch mechanism allows operation of the interior door handle.

15. The door assembly of claim 14, wherein the third face defines an aperture; and wherein the cancel lever is coupled to a pivot located-along the third face such that the cancel lever projects out of the aperture when in the latch operation allowing position.

16. The door assembly of claim 15, wherein a portion of the cancel lever configured to be contacted by the second door is closer in the longitudinal direction of the vehicle to the first end of the portal than the pivot.

17. The door assembly of claim of claim 15, wherein the cancel lever rotates about the pivot in the same direction as the second door rotates with respect to the second end of the portal when the cancel lever is contacted by the second door to move from the latch operation allowing position to the latch operation prevention position.

18. The door assembly of claim 14, wherein the cancel lever is arranged to be contacted by the second door at any location within in a zone of contact determined by the relative positions of the first and second doors such that a moment is applied to the cancel lever upon contact by the second door.

* * * * *